United States Patent
Nicolson et al.

(10) Patent No.: US 9,589,115 B2
(45) Date of Patent: Mar. 7, 2017

(54) OBFUSCATION ASSISTING APPARATUS

(75) Inventors: Kenneth Alexander Nicolson, Hyogo (JP); Rieko Asai, Osaka (JP); Taichi Sato, Kyoto (JP); Hideki Matsushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2011 days.

(21) Appl. No.: 12/376,844

(22) PCT Filed: Jan. 17, 2008

(86) PCT No.: PCT/JP2008/050922
§ 371 (c)(1),
(2), (4) Date: Feb. 9, 2009

(87) PCT Pub. No.: WO2008/088073
PCT Pub. Date: Jul. 24, 2008

(65) Prior Publication Data
US 2010/0180346 A1 Jul. 15, 2010

(30) Foreign Application Priority Data
Jan. 18, 2007 (JP) ................................. 2007-009622

(51) Int. Cl.
G06F 7/04 (2006.01)
G06F 21/14 (2013.01)

(52) U.S. Cl.
CPC .................... *G06F 21/14* (2013.01)

(58) Field of Classification Search
CPC ...................................................... G06F 21/14
(Continued)

(56) References Cited

U.S. PATENT DOCUMENTS 5,371,747 A 12/1994 Brooks et al.
5,410,648 A 4/1995 Pazel
(Continued)

FOREIGN PATENT DOCUMENTS

JP 11-194957 7/1999
JP 2002-514333 5/2002
(Continued)

OTHER PUBLICATIONS

International Search Report issued Apr. 29, 2008 in the International (PCT) Application of which the present application is the U.S. National Stage.
(Continued)

*Primary Examiner* — Steven Kim
(74) *Attorney, Agent, or Firm* — Wenderoth, Lind & Ponack, L.L.P.

(57) ABSTRACT

An obfuscation assisting apparatus assists in the obfuscation of a program. The obfuscation assisting apparatus includes an analyzer which identifies corresponding respective blocks in the source code and in the transformed code generated through the obfuscation of the source code. A browser obtains obfuscation information relating to obfuscation of the respective blocks of the source code and the transformed code, and causes an output device to display the respective parts of the source code and the transformed code, and the obfuscation information in association with each other.

5 Claims, 10 Drawing Sheets

(58) Field of Classification Search
USPC .............................................. 713/194; 726/26
See application file for complete search history.

(56) References Cited

U.S. PATENT DOCUMENTS

| | | | |
|---|---|---|---|
| 5,913,052 A * | 6/1999 | Beatty et al. | 703/15 |
| 6,006,328 A * | 12/1999 | Drake | 726/23 |
| 6,249,907 B1 * | 6/2001 | Carter et al. | 717/129 |
| 6,286,132 B1 | 9/2001 | Tanaka et al. | |
| 6,334,189 B1 * | 12/2001 | Granger et al. | 726/26 |
| 6,480,959 B1 * | 11/2002 | Granger et al. | 713/189 |
| 6,643,775 B1 * | 11/2003 | Granger et al. | 713/190 |
| 6,668,325 B1 * | 12/2003 | Collberg et al. | 713/194 |
| 7,254,586 B2 * | 8/2007 | Chen et al. | 713/190 |
| 7,263,722 B1 * | 8/2007 | Luo et al. | 726/26 |
| 7,269,740 B2 * | 9/2007 | Cuenod et al. | 713/189 |
| 7,272,725 B2 * | 9/2007 | Cuenod et al. | 713/193 |
| 7,287,166 B1 * | 10/2007 | Chang et al. | 713/187 |
| 7,308,576 B2 * | 12/2007 | Glew et al. | 713/170 |
| 7,343,494 B2 * | 3/2008 | Cuenod et al. | 713/193 |
| 7,353,499 B2 * | 4/2008 | de Jong | 717/127 |
| 7,363,620 B2 * | 4/2008 | de Jong | 717/141 |
| 7,383,443 B2 * | 6/2008 | Zeman et al. | 713/190 |
| 7,397,916 B2 * | 7/2008 | Johnson et al. | 380/28 |
| 7,415,618 B2 * | 8/2008 | de Jong | 713/190 |
| 7,421,586 B2 * | 9/2008 | Luo et al. | 713/187 |
| 7,424,620 B2 * | 9/2008 | de Jong | 713/190 |
| 7,430,670 B1 * | 9/2008 | Horning et al. | 713/190 |
| 7,434,064 B2 * | 10/2008 | Cuenod et al. | 713/189 |
| 7,434,068 B2 * | 10/2008 | Nguyen et al. | 713/193 |
| 7,434,898 B2 * | 10/2008 | Futa et al. | 726/26 |
| 7,447,912 B2 * | 11/2008 | Jakubowski et al. | 713/187 |
| 7,454,323 B1 * | 11/2008 | Bain | 703/13 |
| 7,502,940 B2 * | 3/2009 | Cuenod et al. | 713/189 |
| 7,506,177 B2 * | 3/2009 | Chow et al. | 713/194 |
| 7,509,687 B2 * | 3/2009 | Ofek et al. | 726/30 |
| 7,555,780 B2 * | 6/2009 | Tucker et al. | 726/26 |
| 7,587,616 B2 * | 9/2009 | Jakubowski | 713/190 |
| 7,591,021 B2 * | 9/2009 | Haselden et al. | 726/26 |
| 7,689,969 B1 * | 3/2010 | Wendling | 717/105 |
| 7,690,039 B2 * | 3/2010 | Schmeidler et al. | 726/26 |
| 7,707,641 B2 * | 4/2010 | Schmeidler et al. | 726/26 |
| 7,779,270 B2 * | 8/2010 | Horning et al. | 713/187 |
| 7,779,394 B2 * | 8/2010 | Horning et al. | 717/136 |
| 7,797,549 B2 * | 9/2010 | Main et al. | 713/186 |
| 7,809,135 B2 * | 10/2010 | Johnson et al. | 380/44 |
| 7,809,138 B2 * | 10/2010 | Shamoon et al. | 380/210 |
| 7,841,009 B1 * | 11/2010 | Smith | 726/26 |
| 7,865,961 B2 * | 1/2011 | Hasegawa et al. | 726/26 |
| 7,958,554 B2 * | 6/2011 | Chow et al. | 726/22 |
| 2003/0093685 A1 * | 5/2003 | Tobin | 713/200 |
| 2004/0003264 A1 * | 1/2004 | Zeman et al. | 713/190 |
| 2004/0003278 A1 * | 1/2004 | Chen et al. | 713/200 |
| 2004/0139340 A1 * | 7/2004 | Johnson et al. | 713/194 |
| 2004/0230797 A1 * | 11/2004 | Ofek et al. | 713/168 |
| 2004/0260933 A1 * | 12/2004 | Lee | 713/193 |
| 2005/0086666 A1 * | 4/2005 | Nason et al. | 719/321 |
| 2005/0183072 A1 * | 8/2005 | Horning et al. | 717/140 |
| 2005/0204348 A1 * | 9/2005 | Horning et al. | 717/140 |
| 2005/0210275 A1 * | 9/2005 | Homing et al. | 713/190 |
| 2006/0195703 A1 | 8/2006 | Jakubowski | |
| 2007/0234070 A1 * | 10/2007 | Horning et al. | 713/190 |
| 2008/0162949 A1 * | 7/2008 | Sato et al. | 713/194 |
| 2008/0168562 A1 | 7/2008 | Haga et al. | |
| 2008/0288921 A1 * | 11/2008 | Jacob et al. | 717/120 |
| 2009/0307783 A1 * | 12/2009 | Maeda et al. | 726/30 |

FOREIGN PATENT DOCUMENTS

| | | |
|---|---|---|
| JP | 2003-316605 | 11/2003 |
| JP | 2003-337629 | 11/2003 |
| JP | 2004-272814 | 9/2004 |
| JP | 2006-235688 | 9/2006 |
| WO | 93/25963 | 12/1993 |
| WO | 99/01815 | 1/1999 |
| WO | 9901815 | 1/1999 |
| WO | 2006/090800 | 8/2006 |

OTHER PUBLICATIONS

Written Opinion of the International Searching Authority issued Apr. 29, 2008 in the International (PCT) Application of which the present application is the U.S. National Stage.

C. Collberg et al., "A Taxonomy of Obfuscating Transformations," Technical Report 148, Department of Computer Science, The University of Auckland, Jul. 1997.

Steven S. Muchnick, "Advanced Compiler Design and Implementation," Morgan Kaufmann Publishers, 1997.

A. V. Aho et al., "Compilers, Principles, Techniques, and Tools," Addison Wesley, 1986.

"Source Debug View Information Architecture," IBM Technical Disclosure Bulletin, vol. 36, No. 09B, Sep. 1993, pp. 307-310.

* cited by examiner

FIG. 3

| Source code | Transformed code | Object code |
|---|---|---|
| i = 3;<br>k = 4;<br>j = i * 2;<br>x = k + j; | tmp0 = 15;<br>tmp1 = 5;<br>i_k = tmp0/tmp1;<br>j = i_k * 2;<br>i_k = tmp1 - 1;<br>x = i_k + j; | mov [tmp0] , 15<br>mov [tmp1] , 5<br>div r1 , [tmp0] , [tmp1]<br>shl r1 , 1<br>mov [j] , r1<br>mov r1 , [tmp1]<br>dec r1<br>add r1 , [j]<br>mov [x] , r1 |

FIG. 10

| Source code | Transformed code | Object code |
|---|---|---|
| i = | Source code 802 | mov [tmp0] , 15 |
| k = | Active variables: 5 of 16  804 | mov [tmp1] , 5 |
| j = | Working set: 31.2%  806 | div r1 , [tmp0] , [tmp1] |
| x = | Average lifetime: 2.2 blocks | r1 , 1 |
|  | Definition use complexity: 0.744 | mov [j] , r1  214 |
|  | Transformed code  808 | mov r1 , [tmp1] |
|  | Active variables: 13 of 75 | dec r1 |
|  | Working set: 17.3% | add r1 , [j] |
|  | Average lifetime: 4.6 blocks | mov [x] , r1 |
|  | Definition-use complexity: 1.68 | |

200    202    204

OBFUSCATION ASSISTING APPARATUS

BACKGROUND OF THE INVENTION

Technical Field

The present invention relates to an obfuscation assisting apparatus which assists obfuscation of a computer program in order to prevent unauthorized analysis and manipulation of the computer program that is to be executed.

Background Art

Software applications often contain certain features that are critical in ensuring that the application can be deployed and used according to the developer's business plans. For instance, for many years dongle-like devices have been used to attempt to enforce software licensing schemes, and recently software-based Digital Rights Management (DRM) schemes have been used to attempt to ensure digital contents such as music, video and written words are experienced by the consumer according to the contents licensing schemes. It is necessary that the algorithms that implement these features are robust against attacks from hackers. As such, a number of methods of code obfuscation for programs have been proposed and many made into commercial products (see for example, Non-patent Reference 1: Christian Collberg, Clark Thomborson, and Douglas Low. A taxonomy of obfuscating transformations. Technical Report 148, Department of Computer Science, University of Auckland, July 1997 (http://www.cs.auckland.ac.nz/~collberg/Research/Publications/CollbergThomborsonLow97a.http://citeseer.ist.psu.edu/collberg97taxonomy.html)). Here, code obfuscation method refers to a transformation method of basically rewriting code such that it is difficult to understand and alter.

It is difficult to generate sufficiently-obfuscated codes in a single attempt. Therefore, it necessary to tune the parameters that control the obfuscation process in order to generate sufficiently-obfuscated codes. However, this tuning is cumbersome work, because the user cannot easily recognize whether or not the tuning made the obfuscation better without running the codes and analyzing the result.

In other words, the conventional obfuscation assisting apparatus analyzes the result of executing an object code of which the source code has been obfuscated and then compiled, and presents the analysis result to the user. Then, the obfuscation assisting apparatus tunes the aforementioned parameters in response to an operation by the user. When the tuning of the parameters is executed in this manner, the source code is re-obfuscated according to the tuned parameters.

Furthermore, compiler and debugger programs, and so on are also proposed (see for example, Non-patent Reference 2: Steven S. Muchnick. Advanced Compiler Design and Implementation. Morgan Kaufmann Publishers, 1997, and Non-patent Reference 3: A. V. Aho, R. Sethi & J. Ullman, Compilers, Principles, Techniques and Tools, Addison Wellsey, 1986, as well as Patent Reference 1: U.S. Pat. No. 5,371,747).

The aforementioned Patent Reference 1 discloses a method for assisting the debugging of optimized code by displaying information on which lines of code have already been executed. In this method, source codes and corresponding machine language codes are displayed by showing the relationship between them. However, although Patent Reference 1 focuses on some of the issues surrounding the debugging of machine language codes, there are some additional requirements that are needed in order to fully evaluate the quality of a transformation.

SUMMARY OF THE INVENTION

However, with the aforementioned obfuscation assisting apparatus, there is the problem that source code obfuscation cannot be sufficiently assisted. In other words, even when the technique disclosed in the aforementioned Patent Reference 1 is applied to the obfuscation supporting apparatus, the obfuscated code and the machine language code are merely displayed, and the user can only recognize the relationship between these codes. Therefore, as described above, the user causes the computer to execute the machine language code, causes the obfuscation assisting apparatus to analyze the result of such execution and, in addition, causes the computer to execute the re-obfuscation of the source code, based on the analysis result. The user needs to repeat this series of processes until a proper level of obfuscation is attained. In other words, with the conventional obfuscation assisting apparatus, proper obfuscation requires much time and effort.

Consequently, the present invention is conceived in view of the aforementioned problem and has as an object to provide an obfuscation assisting apparatus which can sufficiently assist obfuscation so as to easily carry out proper obfuscation of a source code.

In order to achieve the aforementioned object, the obfuscation assisting apparatus in the present invention is an obfuscation assisting apparatus which assists obfuscation of a program, the obfuscation assisting apparatus including: an analyzing unit which identifies a focusing part in a source code and a focusing part in an obfuscated code that correspond to each other, the source code being a program written in a high-level language, and the obfuscated code being written in the high-level language and generated by obfuscating the source code; an obtaining unit which obtains obfuscation information relating to obfuscation of the respective focusing parts of the source code and the obfuscated code; and a display control unit which causes a display unit to display, in association with each other, the respective focusing parts of the source code and the obfuscated code identified by the analyzing unit, and the obfuscation information obtained by the obtaining unit.

Accordingly, since the respective focusing parts of the source code and the obfuscated code and the respective obfuscation information regarding such focusing parts are displayed in association with each other, the user can easily recognize which part of one code corresponds to a part of the other code, and can easily compare such parts. In addition, the user can easily understand obfuscation information, such as the obfuscation parameters for those parts. As a result, the user can cause the computer to execute obfuscation of the source code once again, based on the details that have been understood, and thus is able to cause the execution of the proper obfuscation of the source code. Therefore, obfuscation of the source code can be sufficiently assisted.

Furthermore, it is also possible that: the obfuscation assisting apparatus further includes: an input unit which receives an operation by a user; and an obfuscation control unit which, in response to the operation received by the input unit, tunes the obfuscation parameters displayed on the display unit, and updates the focusing part of the obfuscated code by causing a computer to obfuscate the focusing part of the source code according to the tuned obfuscation, parameters.

Accordingly, since the obfuscation parameters are tuned according to the operation by the user, the user can check the displayed obfuscation parameters, and the respective focusing parts of the source code and the obfuscated code to which the obfuscation parameters have been applied, and easily and properly tune the obfuscation parameters based on the checked details. In addition, since the focusing part of the source code is re-obfuscated according to the tuned obfuscation parameters, the user can easily and properly have the focusing part of the source code obfuscated. In other words, it is possible to eliminate the trouble of having the user operate a computer having an obfuscation function, specifying, to the computer, the part to which the tuned obfuscation parameters should be applied, and so on, and having the computer execute re-obfuscation. For example, when the user looks at the displayed respective focusing parts of the source code and the obfuscated code and judges that sufficient obfuscation has not been carried out, it is possible to easily tune the obfuscation parameters so as to increase the level of obfuscation. In other words, in the present invention, it is possible to achieve proper and easy tuning and setting of obfuscation parameters.

Furthermore, it is also possible that: the obtaining unit further obtains the tuned obfuscation parameters, and the display control unit further causes the display unit to display, in association with each other, the focusing part of the source code, the updated focusing part of the obfuscated code, and the tuned obfuscation parameters.

Accordingly, the user can carry out the tuning of the obfuscation parameters through cut and try while checking the displayed focusing part of the source code and the focusing part of the obfuscated code that is updated, and set the proper obfuscation parameters.

Furthermore, it is also possible that: the analyzing unit further identifies a part, in an object code, that corresponds to the respective focusing parts of the source code and the obfuscated code, as a focusing part of the object code, the object code being generated by compiling the obfuscated code, and the display control unit further causes the display unit to display the focusing part of the object code in association with the respective focusing parts of the source code and the obfuscated code.

Accordingly, since corresponding parts in each of the source code, the obfuscated code, and the object code are displayed, as focusing parts, in association with each other, the user can easily recognize which part of two codes are corresponding to a part of the other one code, and can easily compare the parts.

Furthermore, it is also possible that: the obfuscation assisting apparatus further includes an executing unit which executes the object code, wherein the analyzing unit identifies a part, in the object code, that is being executed by the executing unit, as the focusing part of the object code, and identifies respective parts, in the source code and the obfuscated code, that correspond to the focusing part of the object code, as the respective focusing parts of the source code and the obfuscated code.

Accordingly, the respective focusing parts and obfuscation information of the currently executing source code, obfuscated code, and object code are displayed, and the displays of the respective focusing parts and obfuscation information are updated in accordance with the execution of the object code. Therefore, the user can compare the focusing parts of the respective codes following the order of execution, and comprehend the obfuscation information of the focusing parts.

Furthermore, it is also possible that: the analyzing unit further identifies a symbol which relates to a command executed by the executing unit, and which is written in the respective focusing parts of the source code, the obfuscated code, and the object code, and the display control unit further causes the display unit to display indicators representing the respective symbols identified by the analyzing unit.

Accordingly, since the parts which are executed in association with each other, among the focusing parts of the respective codes, are indicated in more detail by the indicator, the user can compare the respective codes in more detail. For example, a line made from plural symbols, an instruction made from plural symbols, units making up a code (code units), and so on, are indicated by an indicator. Such indicator is, for example, the underlining for a symbol, the display color for a symbol, or the font for the symbol.

Furthermore, it is also possible that: The obfuscation assisting apparatus further includes a metric calculating unit which calculates a metric indicating a level or quality of difficulty of analyzing the focusing part of the obfuscated code, wherein the obtaining unit obtains, as the obfuscation information, the metric calculated by the metric calculating unit.

Accordingly, since the metric for the focusing part of the obfuscated code are displayed in association with the respective focusing parts of the source code and the obfuscated code, the user can easily recognize the level of obfuscation of the focusing part of the obfuscated code.

Furthermore, it is also possible that: the metric calculating unit, when the focusing part of the obfuscated code identified by the analyzing unit is changed, calculates a metric for the focusing part and stores the calculated metric in a recording medium, so as to create a history of the metric.

Accordingly, when the focusing part changes, the user can check the change in the metric, and can easily find the parts for which obfuscation is inappropriate.

Furthermore, it is also possible that: the obfuscation assisting apparatus further includes an executing unit which executes an object code generated by compiling the obfuscated code, wherein the analyzing unit alters the respective parts to be identified, by identifying, as the respective focusing parts of the source code and the obfuscated code, respective parts in the source code and in the obfuscated code that correspond to a part that is being executed by the executing unit in the object code.

Accordingly, the respective focusing parts and metric of the currently executing source code and obfuscated code are displayed, and the display of the focusing parts and the metric is updated in accordance to the execution of the object code. Therefore, following the order of execution, the user can compare the focusing parts of the respective codes, and easily recognize the metric thereof.

Furthermore, it is also possible that: the executing unit stops execution of the object code when a value of a metric calculated last by the metric calculating unit becomes smaller than a predetermined threshold, or stops execution of the object code when the value of the metric becomes larger than the predetermined threshold.

Accordingly, since the execution of the object code is stopped at the point when the value of the metric becomes smaller or larger than the threshold, and in a state where the respective focusing parts of the source code and obfuscated code, corresponding to the metric are displayed, it is possible to show to the user the parts for which the level of obfuscation is inappropriate, and the usability for the user is further improved.

Furthermore, it is also possible that: the metric calculating unit further calculates a metric indicating a level or quality of difficulty of analyzing the focusing part of the source code, and the display control unit causes the display unit to display the metric of the source code in association with the respective focusing parts of the source code and the obfuscated code.

Accordingly, since the metric of the source code and the metric of the obfuscated code are displayed, the user can compare the respective metric and can easily recognize how obfuscated the focusing part of the obfuscated code is from the focusing part of the source code.

For example, the metric calculating unit calculates a number of actively used variables among variables in the focusing part of the obfuscated code, as the metric. Alternatively, the metric calculating unit calculates a percentage of actively used variables among variables in the focusing part of the obfuscated code, as the metric. Alternatively, the metric calculating unit is operable to calculate an average lifetime of actively used variables among variables in the focusing part of the obfuscated code, as the metric.

Accordingly, since the level of obfuscation as seen from a specific perspective is displayed for the focusing part of the obfuscated code, the user can easily comprehend the level of obfuscation for that perspective.

Furthermore, it is also possible that: the obfuscation assisting apparatus further includes an input unit which receives an operation by a user, wherein the analyzing unit identifies the respective focusing parts of the source code and the obfuscated code in response to the operation received by the input unit.

Accordingly, the user can specify for example, a desired part in one of the source code and the obfuscated code as a the focusing point, and have the focusing part of the other code corresponding to the specified part displayed, usability for the user can be improved.

Moreover, whilst the background art describe ways to present debug information from transformed code (obfuscated code) to the user and how to calculate the quality of transformed code, it does not suggest how these two factors may be combined. Furthermore, the idea of controlling the transformation (obfuscation) process by observing the codes before and after transformation (obfuscation) has never been disclosed by the background art.

The quality of a particular transformation is measured by metrics, and for a particular line in the transformed code a set of metrics can be evaluated to describe the quality of code at a particular instant in the execution process.

When presented with the object code, transformed code (if different from object code) and source code corresponding to the current point of execution of a program, and in addition the metrics described above, the user can make a judgment on the quality of the transformation process and adjust the parameters of such process accordingly.

Therefore, there is an unmet need for, and it would be highly useful to have, a system and method that allows the user to see the relationships between object code, transformed code and the source code (original code), such that in the original code the state of the operators and operands can be visualized, namely whether they have already been calculated, are in the process of being calculated, or have not at all been calculated, to enable the user to quantify the quality of a transformation during checking of the transformation results.

Furthermore, there is an unmet need for, and it would be highly useful to have, a system and method that in addition to the above, allows the user to on demand alter (tune) the transformation parameters (obfuscation parameters) for the code at the point being currently examined, to enable the user to adjust the quality of the obfuscation.

Furthermore, there is an unmet need for, and it would be highly useful to have, a system and method that in addition to the above, displays for the point in the code currently being examined a set of metrics that represent the complexity or quality of one or more of the object code, transformed code and source code at that particular point in the execution flow.

Furthermore, displaying the relationship between the object code, transformed code, and source code is performed by ensuring that the transformation (obfuscation) and code generation (compiling) processes produce additional information (code/variable movement information) regarding the mapping from the input data to the output data, both in terms of the code statements and the variables used. This additional information is then processed by the analyzer method, so given a particular location within the executing code, the analyzer method will discover the corresponding locations in the transformed code and in the source code, then discover the mappings to the transformed variables and expressions from the object code register and memory usage state, then discover the mappings to the original variables and expressions from the transformed variables and expressions, enabling the calculation state of the original variables and expressions to be displayed.

Furthermore, once the mappings from object code to source code are made, adjusting the transformation parameters is performed by determining the active set of transformation parameters for the code currently being examined, then presenting to the user an interface that may be manipulated in order to set new transformation parameters.

Furthermore, once the mappings from object code to source code are made, displaying a set of metrics that describe the complexity or quality of one or more of the object code, transformed code and source code at that particular point in the execution flow is performed by calculating for the currently active line of code, or block of code when there is not a direct one-to-one relationship in the transformation processes, a set of metrics that characterise the line or block of code in relation to the whole module.

Note that present invention can be implemented, not only as the above-described obfuscation assisting apparatus, but also as a method of obfuscating a source code performed by the obfuscation assisting apparatus, a storage medium on which a program thereof is stored, or an integrated circuit for implementing the functions of the obfuscation assisting apparatus.

The obfuscation assisting apparatus in the present invention produces the effect of being able to sufficiently assist obfuscation so that proper obfuscation of a source code can be easily carried out. As a result, it is possible to improve the quality of obfuscation.

Further Information about Technical Background to this Application

The disclosure of Japanese Patent Application No. 2007-009622 filed on Jan. 18, 2007 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing an example of the synchronized code and data display in the embodiment of the present invention;

FIG. 10 is a diagram showing an example of the synchronized code and data display and the synchronized matrix display according to a modification of the embodiment of the present invention;

DETAILED DESCRIPTION OF THE INVENTION

Figure 1:
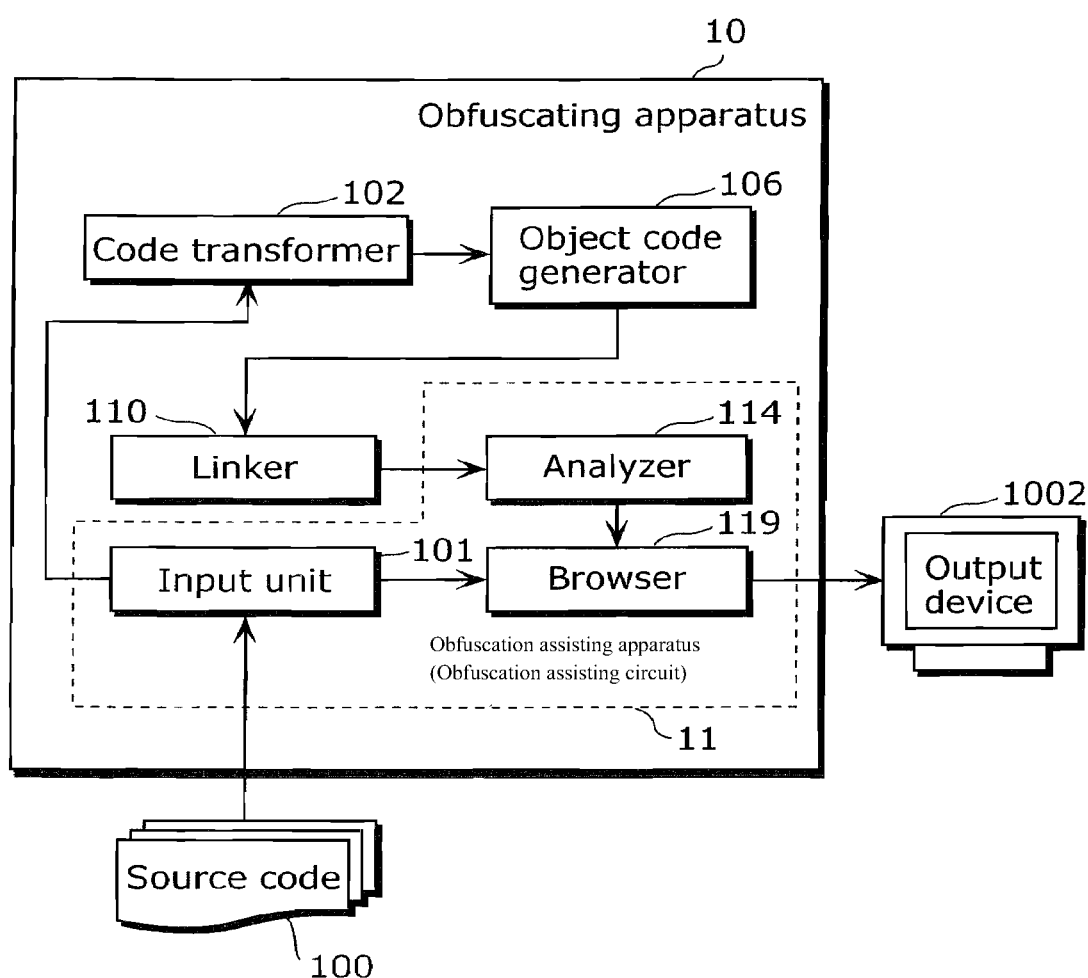
FIG. 1 is a diagram showing the configuration of an obfuscating apparatus equipped with the obfuscation assisting apparatus in the embodiment of the present invention.

Hereinafter, the obfuscation assisting apparatus in the embodiment of the present invention shall be described with reference to the figures.

Note that although in the present embodiment, a system for adding the human factor into the evaluation and application of obfuscation is described, the present invention is not limited to such, and can also be applied in optimization and other code transformation techniques. In the present invention, by comparing the program code and data before and after transformation (obfuscation), and by displaying metrics characterising the running code, the user is able to adjust transformation parameters based on both observed and calculated performance, allowing a higher quality transformation to be made.

I. Terminology

As used hereinafter, the following terms have the following meanings, except when specifically indicated otherwise.

The term "metrics" means values that express the degree to which the examined code satisfies some evaluation criterion. For example, one popular metric for measuring source code is lines per function. The number in isolation does not mean much, but when comparing two functions, it is possible to recognize whether or not the code has improved by comparing the two resultant metrics" is better here (for example, an evaluation criterion for optimization might become the lower the metric the better in the above case). Other metrics used in the present invention will be introduced after.

The term "fundamental block" means a collection of one or more executable statements that correspond to lines of code within the original module. In the preferred embodiment each fundamental block represents one basic block, where a basic block is defined as code that has one entry point (i.e., no code within it is the destination of a jump instruction), one exit point and no jump instructions contained within it, but aside from this, in the present embodiment, it is possible to use larger or smaller-grained blocks as necessary, or even disjoint groupings of lines of code.

The term "code unit" means a complete sub-branch of a program code's parse tree. A parse tree is defined as a tree that represents the syntactic structure of a source code according to its formal grammar; a complete sub-branch of this tree is a chosen node in this parse tree and all the nodes below it. Each module has one or more code units, and each node within a parse tree may correspond to one or more code units. For example, given the expression "a=(b*c)+1;", there are many code units. Each individual operand may be a code unit, the expressions "b*c" and "(b*c)+1" may be too, as may the whole statement. There is an overlap with fundamental blocks as defined above, but the two concepts have distinct uses within present invention, so they do need to be differentiated between.

The term "obfuscation", "obfuscating transformation", or "obfuscating" means transforming program code without changing the semantics in order to hide the original intent of the code, for instance by increasing complexity. Obfuscations may be measured by analyzing the metrics of the obfuscated code, or the original and obfuscated program together, to obtain an understanding of the complexity, etc, of the transformed code.

The term "optimization", "optimizing transformation" or "optimizing" means transforming program code in order to improve the performance of the code, for instance by moving constant calculations from inside a loop to outside of it.

The term "transformation" refers to either an optimizing or an obfuscating transformation in the preferred embodiment, as the method described within this the preferred embodiment is applicable to either type of transformation. But the meaning of the transformation is not limited these two types. Other type of changing of codes can be applicable as long as their quality can be evaluated with the use of the metrics. Transformations may be from source code to another source code, source code to intermediate representations, or source code to object code.

The term "original code", "source code" and the associated "original code module" and "original module" terms, refers to files containing sets of instructions that have yet to have transformations applied. In the preferred embodiment, the programming language for each file can be one of C, C++ or Java™, but other languages may be used. Furthermore low-level language, such as assembly language, may be used instead of the high-level language. Similarly, "transformed code", "obfuscated code" and "transformed module" also refer to files containing sets of instructions, but after one or more obfuscating or optimizing transformation has been applied. In the preferred embodiment the same computer programming language or encoding is used for both the original and obfuscated modules, but as long as there is a mapping from the original module's language to the obfuscated module's language, the techniques described by this application may be applied even when the input language for a transformation differs from the output language.

The term "definition-use web" is described in Non-patent Reference 2. It is made up from one or more intersecting "definition-use chains", where the definition-use chain is defined as the set of fundamental blocks in the path from a particular assignment of a value to a variable to all the blocks in which this assigned value is used. These definition-use chains may be constructed by performing data-flow analysis on a given code module to connect each definition of a variable to all the uses to which it may flow. More detail of definition-use web and definition-use chains can be understood from the document described above.

Other terms are introduced and defined throughout the detailed description below.

II. Description

A new method for evaluating and tuning the process of transforming code in order to improve the quality is described.

There are three key phases in the method; first, the transformation is performed in such a fashion that the movement of variables and code may be displayed to the user; second, when examining the executing code, there is an easy way to adjust the transformation process; and third, to aid the user in evaluating the quality of the transformation and to assist decision making on how to adjust the transformation process, metrics related to the currently executing code will be presented to the user.

FIG. 1 is a diagram showing the configuration of an obfuscating apparatus equipped with the obfuscation assisting apparatus in the present embodiment.

An Obfuscation apparatus 10 is an apparatus which easily and properly obfuscates and then compiles a Source code 10 written in a high-level language such as C-language, and includes a Code transformer 102, an Object code generator 106, a Linker 110, and an Obfuscation assisting apparatus 11.

Note that although in the present embodiment description is carried out exemplifying the obfuscation of the Source code 100, this obfuscation is merely an example of a transformation, and other transformation such as optimization may also be performed on the Source code 100.

The Code transformer 102 reads the Source code 100 from the Obfuscation assisting apparatus 11. Subsequently, the Code transformer 102 obfuscates the Source code 100 according to transformation parameters (obfuscation parameters) which are obfuscation information regarding obfuscation and which are written in the Source code 100, and outputs the obfuscated Source code 100 as a transformed code (obfuscated code). Note that the transformed code is written, for example, in the same high-level language as the Source code 100.

The Object code generator 106 generates an object code written in machine language, by compiling the transformed code.

The Linker 110 generates an executable code by adding a necessary library, and the like, to the object code.

The Obfuscation assisting apparatus is an apparatus which assists the obfuscation by the Code transformer 102 so as to enable easy setting of proper transformation parameters, and which includes an Input unit 101, an Analyzer 114, and a browser 119.

The Input unit 101 includes, a keyboard, a mouse, or a connector for connecting with another apparatus. The Input unit 101 obtains the Source code 100 from another apparatus or the like, and receives transformation parameters (obfuscation parameters) necessary for obfuscation, according to the operation by a user. Then, the Input unit 101 outputs the received transformation parameters to the browser 119. In addition, the Input unit 101 writes the received transformation parameters in the Source code 100, and outputs, to the Code transformer 102, the Source code 100 in which the transformation parameters have been written.

Furthermore, when writing the transformation parameters in the Source code 100, the Input unit 101 adds, to the Source code 100, a mark for identifying the part (enclosing transformation block) of the Source code 100 to which the transformation parameters are applied. In other words, the Input unit 101 identifies enclosing transformation blocks from within the Source code 100 according to an operation by the user and, for each of the enclosing transformation blocks, the Input unit 101 writes, in the Source code 100, the transformation parameters to be applied to that enclosing transformation block, and the mark for identifying that enclosing transformation block, as a message for the Code transformer 102. Note that in the present embodiment, the Input unit 101 is configured as an obfuscation control unit.

The Analyzer 114 executes the executable code generated by the Linker 110, and analyzes which part of the respective codes, such as the transformed code or the Source code 100, the part being executed within the executable code corresponds to. In other words, in the present embodiment, the Analyzer 114 is configured as an executing unit for executing an object code (executable code) and identifying corresponding focusing parts in each of the Source code 100, transformed code, and the object code.

The browser 119 causes the Code transformer 102 to display the corresponding parts in each of the Source code 100, transformed code, and the object code, as well as the transformation parameters applied to that part in association with each other, based on the analysis report of the Analyzer 114. Note that in the present embodiment, the browser 119 is configured as an obtaining unit for obtaining transformation parameters, as well as being configured as a display control unit for causing the displaying of the respective focusing parts of the Source code 100, the transformed code, and the object code, as well as the transformation parameters, in association with each other.

The Output device 1002 is configured of a liquid crystal display, for example, and displays the details outputted from the browser 119.

Note that the respective constituent elements of the Obfuscating apparatus 10 and the Obfuscation assisting apparatus 11 is generally implemented as a part of software that can be executed by a Central Processing Unit (CPU). However, a part or all of the constituent elements may also be implemented by hardware.

Figure 2:
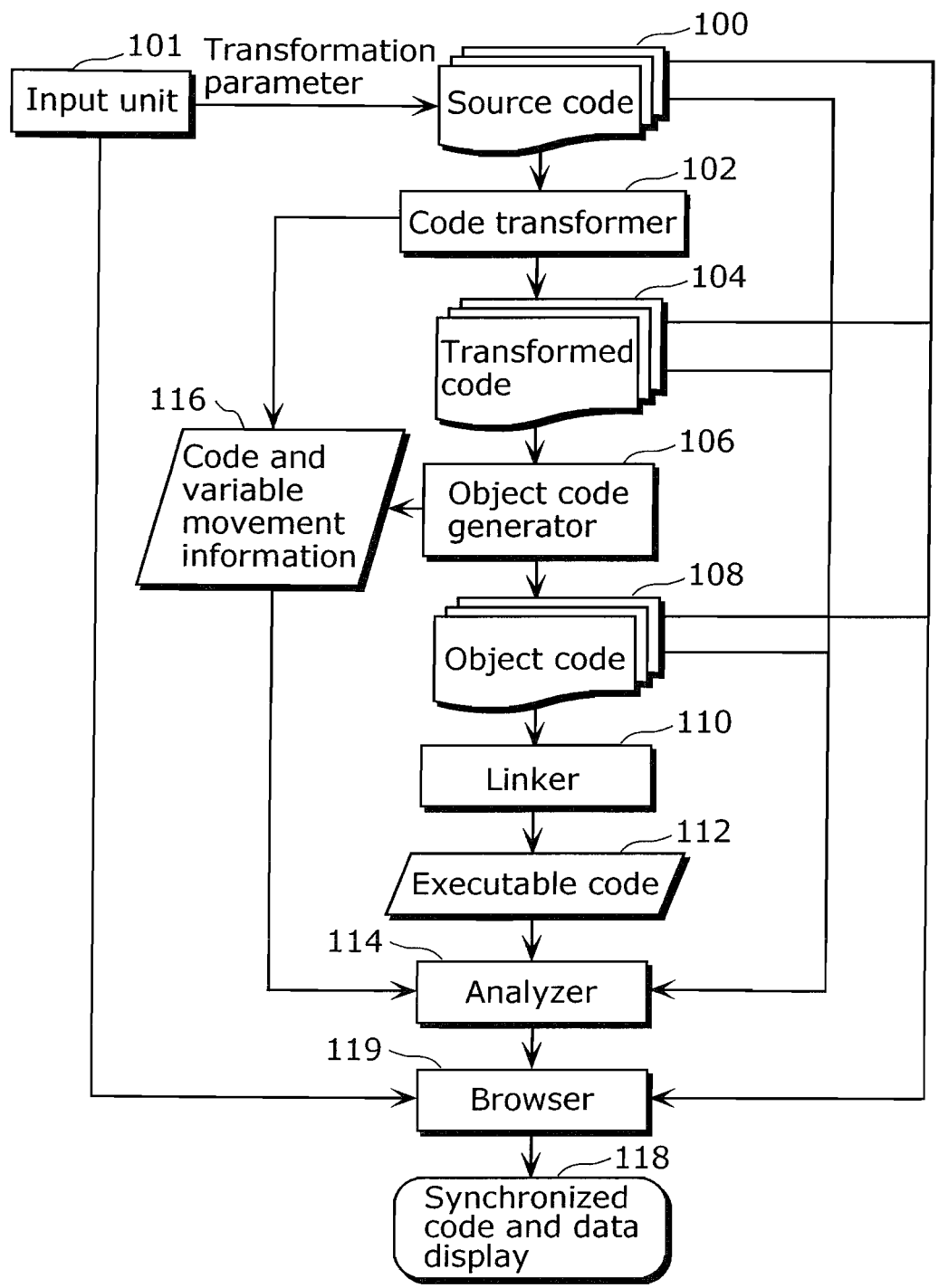
FIG. 2 is a diagram showing an example of the operation of the obfuscating apparatus in the embodiment of the present invention.

FIG. 2 is a diagram showing an example of the operation of the Obfuscating apparatus 10 which includes the Obfuscation assisting apparatus in the present embodiment.

The Source code 100 is processed by the Code transformer 102 (by one or more obfuscation or optimization techniques), and as a result, the aforementioned Transformed code 104 is produced. In addition, this process also produces Code and variable movement information 116, data that describes how expressions, lines of code, fundamental blocks, variables, etc have moved, been copied, deleted, merged.

Next, the Object code generator 106 will produce the previously-mentioned Object code 108 from the Transformed code 104; then the Linker 110 will produce an Executable code 112 that will be run under the Analyzer 114. This Analyzer 114 will process the Code and variable movement information 116 to enable the rendering of the Synchronized code and data display 118 described later. This rendering method will also need the previously-mentioned Source code 100 and Transformed code 104 in order correctly display the current state of the executing code. The rendered display is shown with use of a browser 119 which has the display function of the output device 1002 and further functions described below.

In other words, the Code transformer 102 generates the Transformed code 104 by obfuscating the respective enclosing transformation blocks of the Source code 100, according to the respective transformation parameters and respective enclosing transformation blocks received by the Input unit 101. In addition, the Code transformer 102 generates information indicating details of the transformation from the Source code 100 to the Transformed code 104, in other words, the movement of variables, and so on, as previously-mentioned.

The Object code generator 106 transforms the Transformed code 104 into the Object code 108, and generates information indicating details of the transformation from the Transformed code 104 to the Object code 108, in other words, the movement of variables, and so on, as previously-mentioned. In this manner, the information indicating the details of transformation, generated by the Code transformer 102 and the Object code generator 106 are outputted to the Analyzer 114 as the Code and variable movement information 116.

The Analyzer 114 executes the executable code 112, and identifies the part of the Object code 108 which corresponds to the part (line, block, and so on) being executed in the Executable code 112, for example. In addition, the Analyzer 114 identifies, based on the Code and variable movement information 116, the respective parts of the Transformed code 104 and the Source code 100 which correspond to such part of the Object code 108. Furthermore, in the case where a part in the Source code 100 is specified by the Input unit 101, for example, the Analyzer 114 identifies the respective parts of the Transformed code 104 and the Object code 108 which correspond to the specified part.

Using the identification result from the Analyzer 114, the browser 119 causes the Output device to display a Synchronized code and data display 118 which displays, in synchronization, the mutually corresponding parts in the Source code 100, the Transformed code 104, and the Object code 108. Furthermore, the browser 119 obtains the transformation parameters applied to such part and causes the Output device 1002 to display the obtained transformation parameters in association with the Synchronized code and data display 118 thereof.

When the user checks the Synchronization code and data display 118 and the transformation parameters displayed on the Output device 1002, and judges that the transformation such as the obfuscation of the Source code 100 is inappropriate, the user alters (tunes) the transformation parameters through operations on the in Input unit 101.

As a result, the Code transformer 102 repeats the execution of the obfuscation of the Source code 100 according to the altered transformation parameters.

FIG. 3 is a diagram showing an example of the Synchronized code and data display 118.

The Synchronized code and data display 118 includes three side-by-side windows, consisting of the Source code window 200, Transformed code window 202, and Object code window 204. The Source code window 200 shows a part (enclosing transformation block) of the Source code 100; the Transformed code window 202 shows a part of the Transformed code 104; and the Object code window 204 shows a part of the Object code 108. In addition, the parts of the respective codes shown by these windows mutually correspond, and are displayed in synchronization with each other.

In addition, already calculated code units such as a Code-unit 210 are highlighted with one style by an indicator, and the like, and the code-unit 208 to be affected by the about to execute Object code-unit 214 (which is a code about to be executed) is highlighted in a different style, here in bold italic. In addition, the line in the Transformed code 104 corresponding to the about to execute Object code-unit 214 is similarly highlighted, here by an underline. The extra inventive display item here is the partially calculated code unit 206. In the figure, the literal value 4 has been replaced by the storing of the value 5 in the location [tmp1] 216, then loading the location [tmp1] and decrementing the register 218. Since the first step 216 has been completed, but the second step 218 has not, the literal value 4 in the Source code 100 206 is indicated, in the Source code window 200, to be partially calculated so as to be displayed, for example, in a different color from the other code-units.

Any of these windows may be turned off, or viewed full-screen as desired by the user, and the highlighting of fully-calculated, partially calculated and about to be calculated code units may similarly be controlled.

In Patent Reference 1, they only show the source code (corresponding to the transformed code in the present invention) and the machine code (corresponding to the object code in the present invention) synchronously. But, it is not sufficient for the system which has other transformation before generating the object code. In the present invention, as mentioned above, the Synchronized code and data display 118 includes the Source code 100, the Transformed code 104, and the Object code 108 in synchronization. Thus, the user can recognize the conditions about the Transformed code 104 and the relationship among them. It is very useful to the system which has transformation (for example, an obfuscating or an optimizing) before generating the Object code 108.

Further, in this embodiment, with the display indicated in FIG. 3 the user may observe the quality of the transformation process and choose to alter the transformation parameters for the currently executing code.

Figure 4:
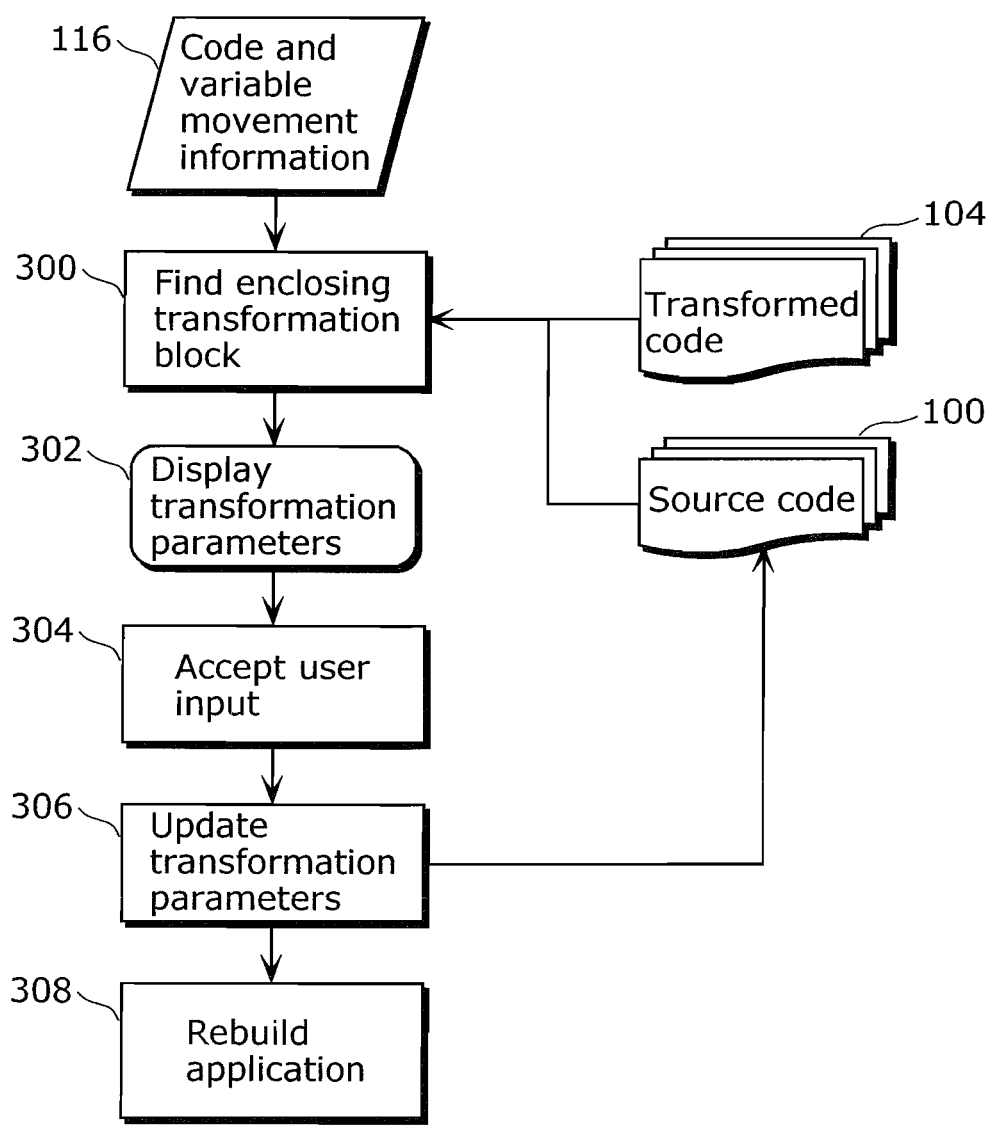
FIG. 4 is a diagram for describing the process within a browser which enables the altering of transformation parameters in the embodiment of the present invention.

FIG. 4 is a diagram for describing the process within the browser 119 that allows the changing of the transformation parameters to be performed.

Figure 5:
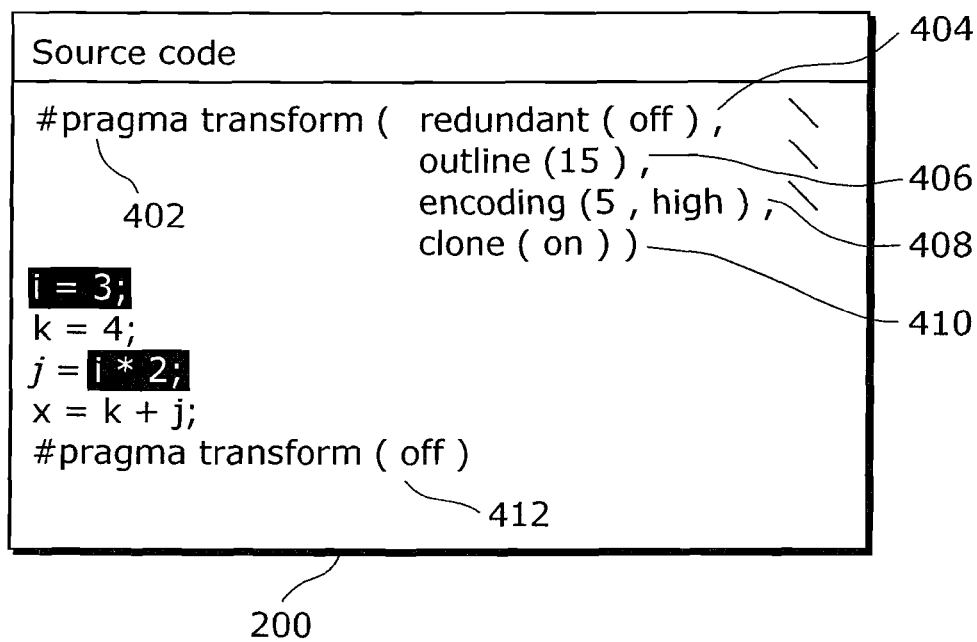
FIG. 5 is a diagram showing another example of a source coding window in the embodiment of the present invention.

When the method to invoke the changing of the transformation parameters is invoked, the first thing to be performed is a Find enclosing transformation block 300. This enclosing transformation block is the block of codes that the current line is within, delimited by start and end markers 402 and 412, respectively, as shown in FIG. 5. The Find enclosing transformation block 300 is performed based on the Code and variable movement information 116, the Source code 100, and the Transformed code 104. By performing similar methods to that for performing the rendering of the Synchronized code and data display 118, the current position in the Source code 100 can be discovered, leading to finding the transformation parameters.

In other words, based on the Code and variable movement information 116 and the Transformed code 104, the browser 119 finds the part of the Source code 100 corresponding to the executing unit in the Object code 108, and discovers the enclosing transformation block that includes such part. Then, the browser 119 obtains the transformation parameters written for such enclosing transformation block of the Source code 100, and causes the Output device 100 to display such transformation parameters (Display transformation parameter 302).

Furthermore, Accept user input 304 allows the user to interact with the transformation parameters. In the present embodiment, this will be done through the operating system's standard graphical user interface. Next, the user input can be used to Update transformation parameters 306 in the Source code 100.

In other words, the user can check the transformation parameters displayed by the Output device 1002, and can alter the displayed transformation parameters by operating the Input unit 101. In other words, the browser 119 changes the displayed transformation parameters according to the operation of the Input unit 101 by the user. In addition, upon receiving the finalization for the altered transformation parameters, the Input unit 101 outputs the altered transformation parameters to the Code transformer 102. Upon obtaining the altered transformation parameters, the Code transformer 102 rewrites the transformation parameters written in the enclosing transformation block of the Source code 100, with the altered transformation parameters.

Finally, the browser 119, through the Rebuild application 308 process, will request the Code transformer 102, Object Code generator 106, Linker 110 and Analyzer 114 to re-transform (re-obfuscate) and re-build the Source code 100 according to the new transformation parameters as described previously in FIG. 2. In this embodiment, the Rebuild application 308 requests the other components to re-transform and re-build, but another implementation, for example, all or parts of the re-transform and re-build are done by the Rebuild application 308 may be used.

FIG. 5 is a diagram showing another example of the Source code window 200.

As shown in FIG. 5, the browser 119 may display, in the Source code window 200, transformation parameters and/or a marking which are written as pragma (instruction statements to the compiler) in the Source code 100. The marking indicates the enclosing transformation block.

In other words, in order to perform Find enclosing transformation block 300, the Source code 100 in the present embodiment using the C or C++ programming languages has, as indicated in FIG. 5, #pragma transform( ) lines 402 that specify the transformation parameters to use. By using the Code and variable movement information 114, the executing the enclosing statement may be easily discovered. In FIG. 5, to make the explanation simple, just the Source code window 200 is displayed. Other windows are not displayed because they do not need the lines 402, but, of course, they can be displayed together with the Source Code window 200.

The lines 402 and 412 are control messages for the Code transformer 102. The lines 402 indicates that the transformation methods (transformation parameters) specified in components 404, 406, 408 and 410 will be applied to a range up to the lines 412, which indicates that the transformation process will finish, is encountered. In the transformation control function (the aforementioned respective components), the names of the transformations to apply are listed, with the arguments for each of these transformations placed between brackets.

In the present embodiment, the transformation methods have been taken from Non-patent Reference 1. First, redundant (off), which is the component 404, refers to the transformation technique 6.2.6 Add Redundant Operands in Non-patent Reference 1, and indicates whether or not redundant expressions that have no effect on the results of calculations should be added to the code. The "off" argument indicates that the transformation (the addition of redundant expressions) is not performed by the Code transformer 102. Outline (15), which is the component 406, is the transformation technique in 6.3.1 Inline and Outline Methods in Non-patent Reference 1, and indicates the inline deployment of functions, and the division of one function into plural functions. Here, parameter "15" indicates that one function is divided into parameters made up of 15 lines. Encoding (5, high), which is component 408, is the transformation technique in 7.1.1 Change Encoding in Non-patent Reference 1, and, for instance, causes loop counters to have an algebraic transformation performed on them. The parameter 5 indicates the percentage of variables to change the encoding, and the argument "high" indicates that a high strength encoding should be used in preference to a low strength (but high performance) encoding. Clone (on), which is the component 410, is the transformation technique in 6.3.3 Clone Methods in Non-patent Reference 1, and indicates that a portion of source codes should be selected, and duplicated. Each instance has a different transformation applied to it. And a different one of the transformed instances is chosen and executed at each run time. The "on" argument indicates that the transformation coefficient is active, but it doesn't have any other arguments. To one skilled in the art, other obfuscating or optimizing transformations may be added to the list, and likewise the parameters available for each transformation may be amended.

A preferred embodiment for implementing Display transformation parameters 302 and Accept user input 304 is via a graphical user interface. The graphical user interface is implemented as a function of browser 119 in the present embodiment.

Figure 6:
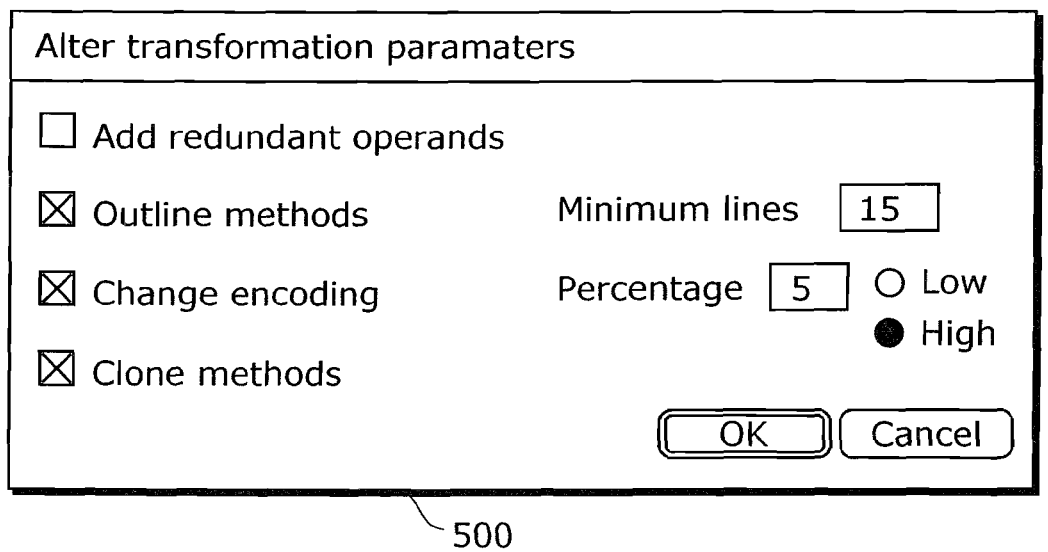
FIG. 6 is a diagram showing an example of the parameter window displayed, on an output device, as a graphical user interface in the embodiment of the present invention.

FIG. 6 is a diagram showing an example of the parameter window displayed by the output device 1002 as a graphical user interface.

The browser 119 causes the Output device 1002 to display a parameter window 500 as shown in FIG. 6. The Parameter window 500 shows the transformation parameters such as the components 404, 406, 408, and 410 shown in FIG. 5, as well as alters the details of the transformation parameters according to the operation of the Input unit 101 by the user, and displays the altered parameters. Furthermore, such a Parameter window 500 may be displayed in association with the Synchronized code and data display 118 shown in FIG. 3 and the Source code window 200 shown in FIG. 5, and may also be displayed in association with a portion of such Synchronized code and data display 118.

Figure 7:
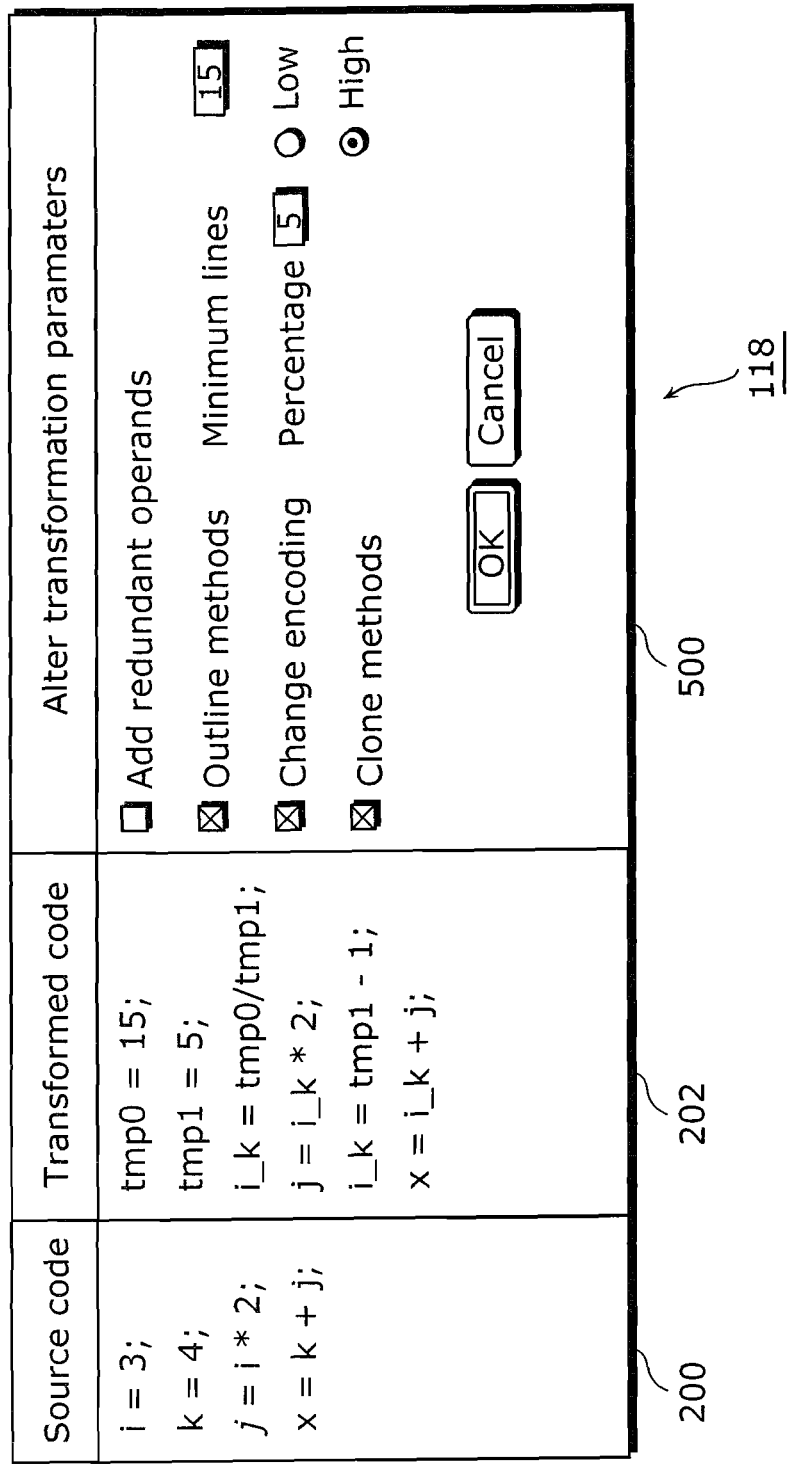
FIG. 7 is a diagram showing an example of the parameter window display method in the embodiment of the present invention.

FIG. 7 is a diagram showing an example of a method of displaying the Parameter window 500.

The browser 119, as shown in FIG. 7 for example, causes the Output device 1002 to display the Source code window 200, the Transformed code window 202, and the Parameter window 500 side-by-side.

Note that in the present embodiment, for each enclosing transformation block in which a current line is included, the Output device 1002 is made to display, in association with, the enclosing transformation block of the Source code 100, a part of the Transformed code 104 corresponding to such enclosing transformation block, a part of the Object code 108 corresponding to such enclosing transformation block, and the transformation parameters applied to such enclosing transformation block. However, aside from displaying for each enclosing transformation block, the Output device 1002 may be made to display the corresponding parts in the respective codes and the transformation parameters, in association with each other, on a different unit-basis, for example, for each fundamental block.

Furthermore, the Output device 1002 may be made to display, in association with each other, the enclosing transformation block of the Source code 100, a part of the Transformed code 104 corresponding to such enclosing transformation block, a part of the Object code 108 corresponding to such enclosing transformation block, and the transformation parameters applied to such enclosing transformation block, for each enclosing transformation block specified by the user, irrespective of the current line.

In this case, for example, the Input unit 101 has a hotkey (shortcut key) or the like, and the browser 119 causes the Output device 1002 to display a toolbar button. Then, with each operation of the hotkey, and each selection of a toolbar button through the operation of the Input unit 101, by the user, a new enclosing transformation block is specified according to the sequence of the plural enclosing transformation blocks written in the Source code 100.

In such manner, in the present embodiment, since the corresponding respective parts in the Source code 100 and the Transformed code 104, and the transformation parameters for their respective focusing parts are displayed in association with each other, the user can easily recognize which part of one of the codes corresponds to a part of the other, and can easily compare such parts. In addition, the user can also easily recognize the transformation parameters for each of the parts. As a result, the user can cause the Obfuscating apparatus 10 to execute obfuscation of the Source code 100 once again, based on the details that have been recognized, and thus is able to cause the execution of the proper obfuscation of the source code. Therefore, obfuscation of the source code can be sufficiently assisted.

Furthermore, since the transformation parameters are altered according to the operation by the user, the user can check the displayed transformation parameters, and the respective focusing parts of the Source code 100 and the Transformed code 104 to which the transformation parameters have been applied, and easily and properly alter the transformation parameters based on the checked details. In addition, since the focusing part (enclosing transformation block) of the Source code 100 is re-transformed according to the altered transformation parameters, the user can easily and properly have the focusing part of the Source code 100 obfuscated. In other words, in the present invention, it is possible to achieve proper and easy tuning and setting of obfuscation parameters. Furthermore, the user can carry out the tuning of the transformation parameters through cut and try while checking the displayed focusing part of the Source code 100 and the focusing part of the Transformed code 104 that is updated as necessary and displayed, and set more proper transformation parameters.

(Modification)

Although in the above-described embodiment, the Obfuscation assisting apparatus 11 causes the Output device 1002 to display the Synchronized code and data display 118 and the Parameter window 500, a synchronized metric display indicating the level or quality of obfuscation of the Transformed code 104 may further be displayed.

Figure 8:
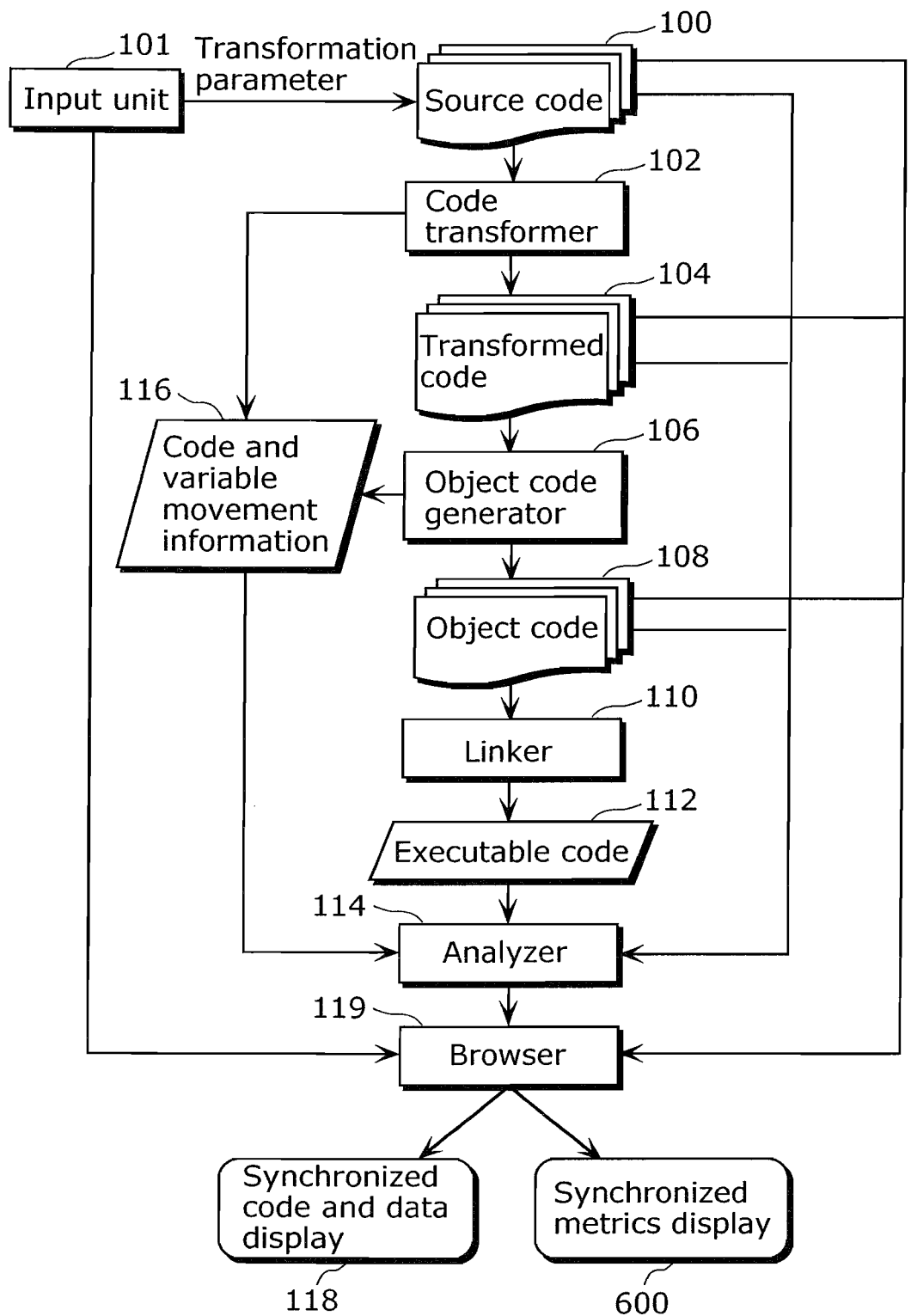
FIG. 8 is a diagram showing an example of the operation of the obfuscating apparatus according to a modification of the embodiment of the present invention.

FIG. 8 is a diagram showing an example of the operation of the Obfuscating apparatus in the present modification.

The Analyzer 114 calculates metrics indicating the level or quality of the difficulty for analyzing the Source code 100 and the Transformed code 104, based on the Source code 100, the Transformed code 104, the Object code 108, and the like. In other words, in the present modification, the Analyzer 114 has the function of a metric calculating unit. The browser 119 causes the Output device 1002 to display a Synchronized metrics display 600 indicating the calculated metrics Through the display of the Synchronized metrics display 600 in this manner, it is possible to assist the user in making judgements regarding the quality of the currently examined code (Transformed code 104).

Figure 9:
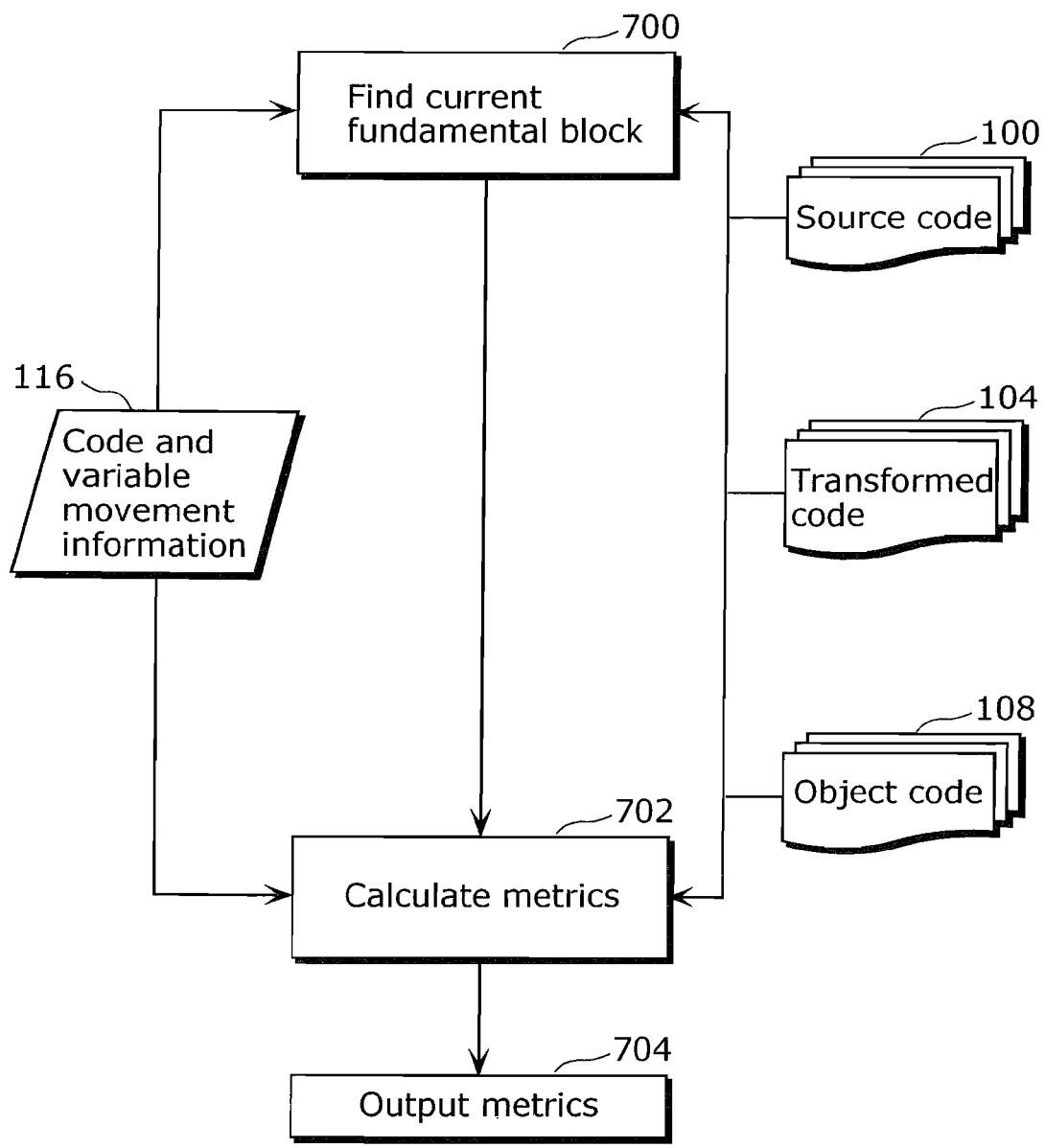
FIG. 9 is a diagram for describing the process for calculating the metrics performed by the analyzer according to a modification of the embodiment of the present invention.

FIG. 9 is a diagram for describing the process for calculating the metrics executed by the Analyzer 114.

First, the Analyzer 114 executes Find current fundamental block 700. A current fundamental block is a fundamental block which is currently executed, this finding differs slightly from the previously described Find enclosing transformation block 300. Find current fundamental block 700 looks at a narrower scope, to find the block in the control flow diagram at which the currently executed code is located, for both the Source code 100 and the Transformed code 104, using the Code and variable movement information 116 and the Object code 108 to guide the search. Once this is located, then Calculate metrics 702 is executed by the Analyzer 114 to evaluate metrics for all of Source code 100, Transformed code 104 and Object code 108.

Note that if most or all of the transformations (obfuscations) are performed before the Object code generator 106 is executed, then the metrics for Transformed code 104 and Object code 108 will be very similar. Therefore, in the present modification, Object code 108 metrics are not described, and the Source code 100 and the Transformed code 104 metrics are described. However, one skilled in the art may modify the present invention to show the Object code 108 metrics if needed. Furthermore, the present invention may be modified to show only one or the arbitrary combination of the Source code 100 metrics, the transformed code metrics, and the object code metrics. In this case, the user may change which metrics are to be shown.

In this manner, the Analyzer 114 according to the present modification sequentially calculates, for each of corresponding fundamental blocks in the Source code 100 and the Transformed code 104, currently being executed.

FIG. 10 is a diagram showing an example of the Synchronized code and data display 118 and the Synchronized metrics display 600.

The Analyzer 114, calculates, for a the active line of executing Object code 108, a set of metrics indicating the complexity or quality of the Source code 100 and the Transformed code 104. As a result, the browser 119 causes the Output device 1002 to display the Synchronized metrics display 600 indicating the calculated set of metrics, and aforementioned active line 214 of the Synchronized code and data display 118, in association with each other. For example, the Synchronized metrics display 600 indicates the metrics 802, 804, 806, 808, and so on. The following section describes details of what each of the metrics represent, and other metrics that may be used to describe code.

(Metrics Used to Measure Transformation Strength)

As previously indicated, FIG. 10 illustrates a number of metrics, targeted in particular at assisting in the evaluation of the quality of an obfuscating transformation.

First, Metrics 802 indicates an active variable. The two figures displayed are first, the number of variables active in the current fundamental block; that is the number of variables, local parameters, global parameters or function parameters, that are set within the block, or are referenced within the block, or have their address taken within the current fundamental block. The second figure is the total number of variables, local global or function parameters, that are actively used within the current fundamental function. For example, in metrics (Active variables) 802 shown in FIG. 10, the first figure is "5" and the second figure is "16". Note that in FIG. 10, the metrics for both the Source code 100 and the Transformed code 104 are displayed.

Next, Metrics 804 indicates a working set. A working set is an alternative representation of Active Metrics (variables) 802, presenting the value as a percentage of active variables to total variables rather than just two numbers as shown in Metrics 802. In metrics (working set) 804 shown in FIG. 10, the percentage is 31.2%.

Metrics 806 indicates average lifetime. The average lifetime is a measure of, for each definition-use pair, the basic building blocks for the definition-use chains and definition-use webs mentioned earlier, active at the current point of execution. In this embodiment, the average life time is the average number of fundamental blocks between the definition point and the use point, obtained from the results of data-flow analysis of the source codes. The Analyzer 114 assigns a score to the length of all the possible paths between each definition-use pair, and counts the number of fundamental blocks in all the paths between each pair. The Analyzer 114 sums up these scores, and then divides them by the total number of chains to get the final average lifetime. For example, the lifetime is the number of all the fundamental blocks on the path from when a value is assigned to the variable, that is, from when the variable is defined, until the variable is used; and the average lifetime indicates the result of adding all the lifetimes of each variable and dividing by the total number of variables.

Metrics 808 indicates the definition-use complexity, and is a more detailed measure of the complexity of the variable definitions and variable uses.

Hereinafter, the definition-use complexity shall be described using a specific code module.

Figure 11:
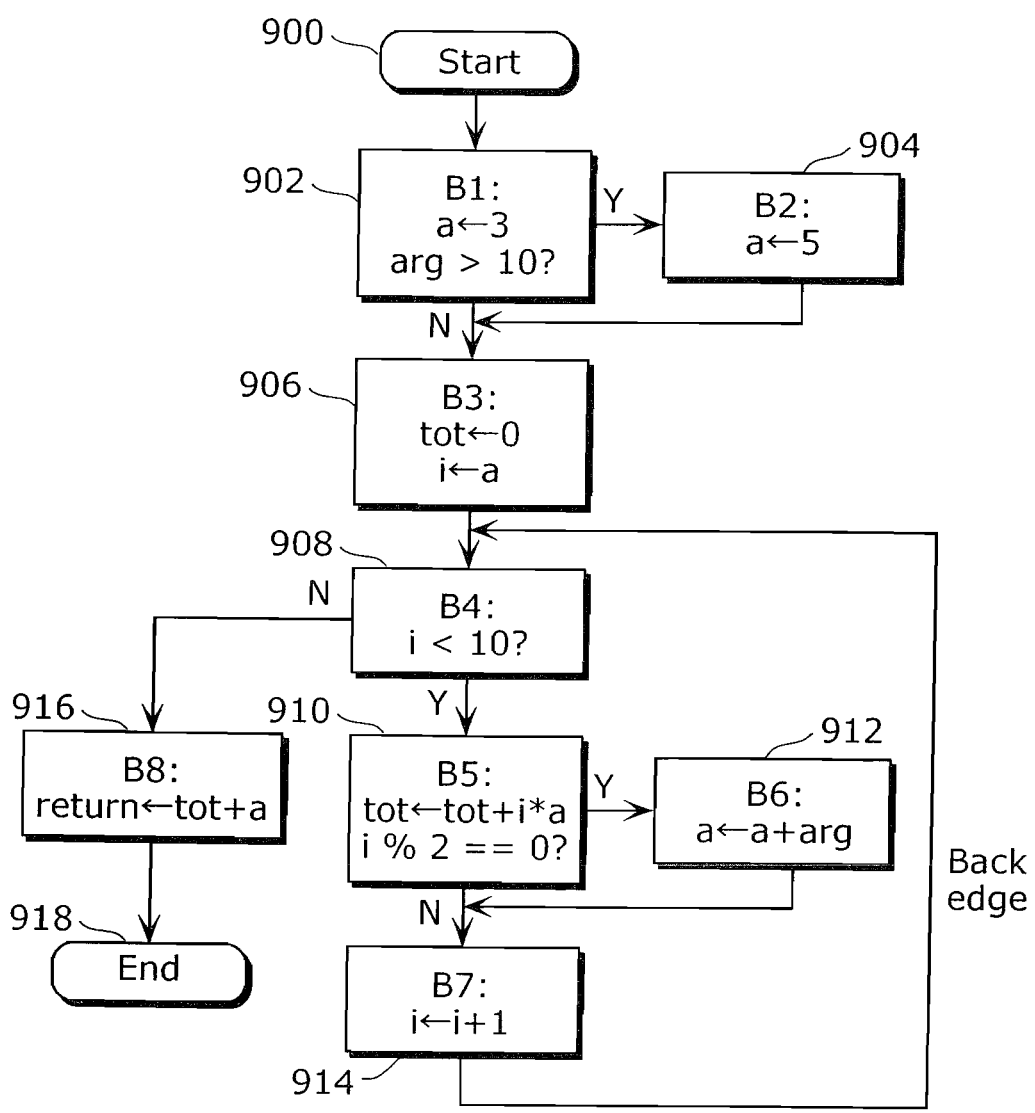
FIG. 11 is a diagram showing the outline configuration of a relatively simple code module for describing the metrics according to a modification of the embodiment of the present invention.

FIG. 11 is a diagram showing an example of a relatively simple code module outline structure. Note that each rectangle in FIG. 11 represents Fundamental blocks 900 to 918 which make up the code module. For example, this code module corresponds to the Transformed code 104. Now, to define the complexity of each definition-use pair, one factor other than the length of the paths between them as described by Metrics (Average lifetime) 806, is used. The Average lifetime 806 is the level of nesting within loops between the definition fundamental block and the use fundamental block. Here, the definition fundamental block is a block in which a variable is assigned a value, and the use fundamental block is a block in which the variable which was assigned the value is used. To quantify this, the number of Steps may be evaluated, describing the number of times the path from definition to use steps into or out of a loop.

First, the Analyzer 114 calculates the nesting level of each fundamental block using a method as suggested by the techniques described in Chapter 10.4 of Non-patent Reference 3. This calculation begins by identifying the back edges within the control flow diagram for the module, the path between two adjacent blocks where the control flow loops back. In the simple code module in FIG. 11, the one back edge from block B7 (914) to block B4 (908) may be visually identifiable. However, programmatically these back edges may be found by testing whether all paths from the start block 900 to the source of the edge (block B7 (914) in this example), pass through the destination of the edge (block B4 (908) in this example). If this is true, then the given edge is a back edge.

Once all the back edges are discovered, each loop can then be determined by finding all the blocks in a path from the destination block of the back edge (for example, block B4 (908)) to the start block of the back edge (for example, block B7 (914)), and that do not pass through the destination of the edge. Thus, block B5 (910) and block B6 (912) are in the loop as they are directly connected to block B7 (914), but block B3 (906), as is block B8 (916), are not in the loop as they are not in all of the paths from block B4 (908) up to block B7 (914). As well at the blocks B5 (910) and B6 (912) that satisfy the rules mentioned, the blocks at either end of the back edge are also added to the set of blocks that are defined as being in a loop.

Now, once all back edges are found and the blocks that make up each loop constructed, the nesting level of each block can be determined by simply counting the number of loop sets that each fundamental block appears. Next, the Analyzer 114 follows the shortest path from the definition fundamental block to a use block, and every time the nesting level changes (i.e. go inside a loop or outside a loop in this embodiment), increment the Steps counter. The final value represents the score for a particular definition-use pair. Finally, to calculate the metric for the complexity of each variable's definition-use pair at a particular fundamental block, first note all definition-use pairs and all fundamental blocks between such definition-use pairs.

TABLE 1 shows the number of Steps for each definition-use pair, calculated for variable a shown in FIG. 11 as defined above.

TABLE 1

| No. | Definition | Use | Path | Number of Steps |
|---|---|---|---|---|
| 1 | B1 902 | B3 906 | | 0 |
| 2 | B1 902 | B5 910 | B3 906 B4 908 | 1 |
| 3 | B1 902 | B6 912 | B3 906 B4 908 B5 910 B7 914 | 1 |
| 4 | B1 902 | B8 916 | B3 906 B4 908 B5 910 B6 912 B7 914 | 2 |
| 5 | B2 904 | B3 906 | | 0 |
| 6 | B2 904 | B5 910 | B3 906 B4 908 | 1 |
| 7 | B2 904 | B6 912 | B3 906 B4 908 B5 910 B7 914 | 1 |
| 8 | B2 904 | B8 916 | B3 906 B4 908 B5 910 B6 912 B7 914 | 2 |
| 9 | B6 912 | B5 910 | B4 908 B7 914 | 0 |
| 10 | B6 912 | B6 912 | B4 908 B5 910 B7 914 | 0 |
| 11 | B6 912 | B8 916 | B4 908 B5 910 B7 914 | 1 |

Note that in this example the definition-use web for variable a is the union of all the definitions and uses from the above table 1.

One measure of the complexity of the above table 1 is defined as that at a given fundamental block, sum up the number of (number of Steps+1) for each definition-use pair that intersects with the given fundamental block, then divide the total (score) by the product of the number of unique definitions and number of unique uses in the table. Note that "number of unique definitions" and "number of unique uses" refer to the number of fundamental blocks that appear without overlapping in the respective "Definition" and "Use" columns in TABLE 1. This gives a metric for indicating the definition-use complexity of a single variable. For the variable a in TABLE 1 at the given fundamental block of B7 (914), all except the first, second, fifth and sixth definition-use pairs pass through the block. The addition result for (number of Steps+1), that is, the score is 14 (=(1+1)+(2+1)+(1+1)+(2+1)+(0+1)+(0+1)+(1+1)). Since unique definitions are performed in blocks B1, B2, and B6, number of unique definitions is (3). Furthermore, since unique uses are performed in blocks B3, B5, B6, and B8, the number of unique uses is (4). Thus, the product of the number of unique definitions and the number of unique uses is 3*4=12, so the final value for the definition-use complexity of variable a at block B7 (914) is 14/12=1.167.

Finally, for each active variable at a given fundamental block, the number of Steps score as described above is calculated, the score for each variable are all summed up, then the products of the number of unique definitions and the number of unique uses for each variable are summed up. By dividing the number summing up all the scores by the number summing up all the products, the definition-use complexity for the fundamental block can be obtained.

In other words, through the above-described method, the Analyzer 114 calculates, as the Metric 808, the definition-use complexity for one active variable in a given fundamental block, and/or the definition-use complexity of the fundamental block.

Note that although in the present modification, the level or quality of the difficulty of analyzing the Source code 100 and the Transformed code 104 are indicated as metrics such as the valid variable, working set, average lifetime, and definition-use complexity, they may be indicated with other metrics. One skilled in the art can see that there are other possible metrics for analyzing and evaluating the complexity of the source code and transformed code that corresponds to the code currently being focused, and the focused code itself. The possible metrics may be measured within the refined categories of measurements above or in totally new categories.

Furthermore, the browser 119 may cause the Synchronized metrics display 600 to display only the metrics specified by the user, among the plural types of metrics such as the aforementioned active variable, working set, and the like.

Furthermore, with every execution of a fundamental block, the Analyzer 114 may create and update a history of various types of metrics by recording the plural types of metrics calculated for that fundamental block. In this case, each time the history of the various types of metrics is updated, the browser 119 causes the updated histories of the various metrics to be displayed as respective traces. Furthermore, every time the history of a type of metrics specified by the user is updated, the browser 119 may cause the updated history of the metrics to be displayed as a trace, instead of or in addition to the traces described above.

In addition, the Analyzer 114 may monitor the created and updated history of the various metrics described above, while executing the Executable code 112. In this case, the Analyzer 114 stops the execution of the Executable code 112 (Object code 108) when the value indicated for any of the types of metrics becomes smaller or larger than a given threshold. For example, when the aforementioned definition-use complexity becomes smaller than a given threshold, the Analyzer 114 stops the execution of the Executable code 112. As a result, the Synchronized code and data display 118, Parameter window 500, and Synchronized metrics display 600 for the last fundamental block that is executed up to that point, that is, the fundamental block having a definition-use complexity that is smaller than the threshold, are displayed. With this, the user can easily find a block of which definition-use complexity should be improved, and can easily alter the transformation parameter for that block.

Furthermore, the history for the various metrics need not be recorded in accordance with the advance of the execution of the Executable code 112. For example, in the case where the fundamental block, for which metrics are calculated, changes according to an input from the user, the metrics may be calculated and the history thereof recorded every time the fundamental block selected by the user changes. In this case, the history to be recorded may be a history of the metrics for the single fundamental block selected by the user, or the total of the metrics obtainable when advancing the execution of the Executable code 112 up to the fundamental block selected by the user.

The explanation for the aforementioned embodiment and a modification of the present invention is finished here, but one skilled in art may extend the present invention into many other modifications. Some other modifications are shown below.

For example, a part of the Object code 108, that is, the Object code window 204, may or may not be displayed in the Synchronized code and data display 118. For example, the browser 119 may display the Object code window 204 when the obfuscation by the Analyzer 119 is judged to be enough. The judgement is done based on the metrics. Alternatively, the browser may display the Object code window 204 based on an input from the user.

Furthermore, in the embodiment and modification described above, the three windows are shown side by side in the Synchronized code and data display 118. However, if a plurality of transformations is performed on the Source code 100, more than 3 windows may be displayed. For example, if both of the obfuscating and the optimizing are performed on the Source code 100, 4 windows may be displayed. The windows may display the corresponding respective parts in the Source code 100, the optimized codes, the obfuscated codes, and the Object code 108. In this case the user may select which window to be displayed. Furthermore, on the other hand, not all of windows need be displayed. Displaying one or more windows may be omitted according to, for example, an input from the user.

Furthermore, in the embodiment and the modification described above, the three windows are shown as three columns side by side in one screen. However, each window may be shown separately or shown at different timing from one another. These implementation are useful if the display screen does not have enough resolution for showing three windows at the same time. In this implementation the user may switch which window is to be focused with his or her input.

Furthermore, in the embodiment and the modification described above, a line executed in the Executable code 112 is adopted as a condition and the transformation parameters applied to the part of the Source code 100, the part of the Transformed code 104, and the part of the Object code 108 that correspond to such line, as well as the metrics for the respective parts are displayed in association with each other. However, it is also possible to have an about to execute line in the Executable code 112 as the condition, and have the aforementioned respective parts of the codes corresponding to the line, as well as the transformation parameters applied to such parts, and the metrics of such parts displayed in association with each other. Furthermore, it is also possible to have a line that is specified by the user as the condition, and have the aforementioned respective parts of the codes corresponding to the line, as well as the transformation parameters applied to such parts, and the metrics of such parts displayed in association with each other. Furthermore, the aforementioned parts of the respective codes may be in any unit-basis, such as a fundamental block or an enclosing transformation block, the whole code, and so on.

Furthermore, in the embodiment and the modification described above, the information (for example, a set of metrics) is shown for the about to execute Object code 108

(or currently executing code). However, the user may manually designate any codes shown in the Synchronized code and data display 118 to which he or she wants to check information. The specific explanation for the process to make the information is omitted here, because it is almost same as making that for the about to execute Object code 108, except for what code unit the information is to be made.

Furthermore, in the embodiment and the modification described above, the set of metrics are calculated for a unit of fundamental block. However, the set of metrics corresponding to a part of the fundamental block may be calculated. In this case, the user may designate the range for calculating the metrics by, for example, dragging the mouse. And the process for calculation of the metrics is performed on the selected range. In this case, the user can flexibly review the transformation strength for the codes on which the user is focusing.

Furthermore, in the embodiment and the modification described above, the code-units are highlighted with using underline or the like that. However, the present invention may be implemented to use other highlight method. For example, drawing lines between corresponding codes, or colouring similar colours to the corresponding codes.

Furthermore, in the embodiment and the modification described above, a part of the about to execute code is focus of examination (subject for display). However, the user may instruct the focusing part using some input devices and through the browser 119. In this case, it is not necessary for the user to specify the focusing part in the Object code 100, or to instruct the focusing part in the Source code 100 or in the Transformed code.

Furthermore, although in the embodiment and the modification described above, in the case where the transformation parameters are altered, the transformation parameters written in the enclosing transformation block of the Source code 100 is rewritten with the altered transformation parameters, it is not limited to such. For example, re-obfuscation may be performed using new transformation parameters, without rewriting the Source code itself. This is possible when, in the process in Rebuild application 308, the transformation parameter in the Source code is disregarded, and rebuilding is performed using new transformation parameters. In this case, the transformation result of the new transformation parameters can be checked, while leaving the original transformation parameters. Furthermore, it is also possible to specify whether or not to rewrite the transformation parameters inside the source code with new transformation parameters according to the instructions of the user. In this case, the user can decide to fix the transformation parameters in the source code after reviewing whether or not the new transformation result satisfies the user's requirement.

(Other Modifications Aside from the Above)

Note that the following cases are also included in the present invention.

(1) Each of aforementioned apparatuses may also be, specifically, a computer system including a microprocessor, a Read Only Memory (ROM), a Random Access Memory (RAM), a hard disk unit, a display unit, a keyboard, a mouse, and the so on. A computer program is stored in the RAM or hard disk unit. The respective apparatuses achieve their functions through the microprocessor's operation according to the computer program. Here, the computer program is configured by combining plural instruction codes indicating instructions for the computer.

(2) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as an individual chip, or as a single chip to include a part or all thereof. In addition, here, System-LSI is mentioned but there are instances where, due to a difference in the degree of integration, the designations IC, LSI, super LSI, and ultra LSI are used.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appear thorough progress in semiconductor technology or other derived technology, that technology can naturally be used to carry out integration of the constituent elements. Biotechnology is anticipated to apply.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and the so on. The IC card or the module may also be included in the aforementioned super-multi-function LSI. The IC card or the module achieves its function through the microprocessor's operation according to the computer program. The IC card or the module may also be implemented to be tamper-resistant.

(4) The present invention, may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a Compact Disk Read Only Memory (CD-ROM), a Magneto-optical disk (MO), a Digital Versatile Disk (DVD), a DVD-ROM, a DVD-RAM, a Blu-ray Disc (BD), High Definition DVD (HD-DVD) and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(5) Those skilled in the art will readily appreciate that many modifications are possible in the exemplary embodiment without materially departing from the novel teachings and advantages of present invention. Accordingly, arbitrary combination of the aforementioned modifications and embodiment is included within the scope of present invention.

The obfuscation assisting apparatus in the present invention produces the effect of being able to sufficiently assist obfuscation so that the proper obfuscation of a source code can be performed easily. The obfuscation assisting apparatus can be applied, for example, to an apparatus which transforms a computer program written in a high-level language then compiles the transformed computer program.

The invention claimed is:

1. Obfuscation assisting apparatus assisting in obfuscation of a program, the obfuscation assisting apparatus comprising:
    a hardware processor; and
    a non-transitory memory storing a program which when executed by the processor causes the obfuscation assisting apparatus to:
        identify a part in a source code and a part in an obfuscated code that correspond to each other, the source code being a program written in a high-level language, and the obfuscated code being written in the high-level language and generated by obfuscating the source code;
        obtain obfuscation parameters used for obfuscating the part of the source code, the obfuscation parameters being code and variable movement information;
        display, via a display unit, in association with each other, the respective parts of the source code and the obfuscated code identified, and the obfuscation parameters obtained, the respective parts of the source code and the obfuscation parameters being comparable while being displayed on the display unit;
        receive an operation for the obfuscation parameters displayed on the display unit from a user; and
        in response to the operation received and based on a result of a comparison between the respective parts of the source code and the obfuscation parameters being displayed, alter the obfuscation parameters displayed on the display unit, obfuscate, via a computer, the part of the source code again by using the altered obfuscation parameters, and update the part of the obfuscated code, such that the obfuscation is assisted by the user thereby providing improved obfuscation of the source code.

2. The obfuscation assisting apparatus according to claim 1, wherein the obfuscation assisting apparatus obtains the altered obfuscation parameters, and the obfuscation assisting apparatus displays, via the display unit, in association with each other, the part of the source code, the updated part of the obfuscated code, and the altered obfuscation parameters.

3. A method for an obfuscation assisting apparatus of assisting obfuscation of a program in an obfuscation assisting apparatus, the obfuscation assisting apparatus including a hardware processor and a non-transitory memory storing a program which when executed by the processor causes the obfuscation assisting apparatus to perform the method comprising:
    identifying a part in a source code and a part in an obfuscated code that correspond to each other, the source code being a program written in a high-level language, and the obfuscated code being written in the high-level language and generated by obfuscating the source code;
    obtaining obfuscation parameters used for obfuscating the part of the source code, the obfuscation parameters being code and variable movement information;
    displaying, via a display unit, in association with each other, the respective parts of the source code and the obfuscated code identified, and the obfuscation parameters obtained, the respective parts of the source code and the obfuscation parameters being comparable while being displayed on the display unit;
    receiving an operation for the obfuscation parameters displayed on the display unit from a user; and
    in response to the operation received and based on a result of a comparison between the respective parts of the source code and the obfuscation parameters being displayed, altering the obfuscation parameters displayed on the display unit, obfuscating, via a computer, the part of the source code again by using the altered obfuscation parameters, and updating the part of the obfuscated code, such that the obfuscation is assisted by the user thereby providing improved obfuscation of the source code.

4. A non-transitory computer-readable recording medium storing a program and used in obfuscation assisting apparatus for assisting obfuscation of a program to be processed, the program causing the obfuscation assisting apparatus to execute the steps comprising:
    identifying a part in a source code and a part in an obfuscated code that correspond to each other, the source code being a program to be processed which is written in a high-level language, and the obfuscated code being written in the high-level language and generated by obfuscating the source code;
    obtaining obfuscation parameters used for obfuscating the part of the source code, the obfuscation parameters being code and variable movement information;
    displaying, via a display unit, in association with each other, the respective parts of the source code and the obfuscated code identified, and the obfuscation parameters obtained, the respective parts of the source code and the obfuscation parameters being comparable while being displayed on the display unit;
    receiving an operation for the obfuscation parameters displayed on the display unit from a user; and
    based on a result of a comparison between the respective parts of the source code and the obfuscation parameters being displayed, altering the obfuscation parameters displayed on the display unit, obfuscating, via a computer, the part of the source code again by using the altered obfuscation parameters, and updating the part of the obfuscated code, such that the obfuscation is assisted by the user thereby providing improved obfuscation of the source code.

5. An integrated circuit used to assist in obfuscation of a program, the integrated circuit comprising:
    a hardware processor; and
    a non-transitory memory storing a program which when executed by the processor causes the obfuscation assisting apparatus to:
        identify a part in a source code and a part in an obfuscated code that correspond to each other, the source code being a program written in a high-level language, and the obfuscated code being written in the high-level language and generated by obfuscating the source code;

obtain obfuscation parameters used for obfuscating the part of the source code, the obfuscation parameters being code and variable movement information;

via a display unit, in association with each other, the respective parts of the source code and the obfuscated code identified by the analyzing unit, and the obfuscation parameters obtained, the respective parts of the source code and the obfuscation parameters being comparable while being displayed on the display unit;

receive an operation for the obfuscation parameters displayed on the display unit from a user; and in response to the operation received and based on a result of a comparison between the respective parts of the source code and the obfuscation parameters being displayed, alter the obfuscation parameters displayed on the display unit, obfuscate, via a computer, the part of the source code again by using the altered obfuscation parameters, and update the part of the obfuscated code, such that the obfuscation is assisted by the user thereby providing improved obfuscation of the source code.

* * * * *